US008784526B2

(12) United States Patent
Brule et al.

(10) Patent No.: US 8,784,526 B2
(45) Date of Patent: Jul. 22, 2014

(54) USE OF MULTI-LAYERED STRUCTURE FOR THE MANUFACTURE OF GAS CONDUCTS, NAMELY FOR METHANE

(71) Applicant: Arkema France, Colombes (FR)

(72) Inventors: Benoit Brule, Beaumont-le-Roger (FR); Sylvain Benet, Bernay (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/875,898

(22) Filed: May 2, 2013

(65) Prior Publication Data

US 2013/0240041 A1    Sep. 19, 2013

Related U.S. Application Data

(63) Continuation of application No. 12/516,708, filed as application No. PCT/FR2007/052395 on Nov. 26, 2007, now abandoned.

(60) Provisional application No. 60/874,934, filed on Dec. 14, 2006.

(30) Foreign Application Priority Data

Nov. 30, 2006  (FR) ...................................... 06 55218

(51) Int. Cl.
*B01D 45/18*   (2006.01)
*B01D 46/04*   (2006.01)
*B01D 46/42*   (2006.01)

(52) U.S. Cl.
USPC ........................................................... 55/428

(58) Field of Classification Search
USPC ........................................................... 55/428
See application file for complete search history.

(56) References Cited

U.S. PATENT DOCUMENTS

| 5,076,329 | A  | 12/1991 | Brunnhofer |
| 5,167,259 | A  | 12/1992 | Brunnhofer |
| 5,469,892 | A  | 11/1995 | Noone et al. |
| 6,374,862 | B1 | 4/2002  | Schwert |
| 6,383,587 | B1 | 5/2002  | Ageheim et al. |
| 6,555,243 | B2 | 4/2003  | Flepp et al. |
| 6,616,191 | B2 | 9/2003  | Beal et al. |
| 6,739,356 | B2 | 5/2004  | Milhas |
| 6,783,821 | B2 | 8/2004  | Ries et al. |
| 7,063,873 | B2 | 6/2006  | Bellet et al. |
| 7,175,896 | B2 | 2/2007  | Schmitz et al. |
| 2002/0012806 | A1 | 1/2002 | Flepp et al. |
| 2002/0036405 | A1 | 3/2002 | Beal et al. |
| 2002/0119272 | A1 | 8/2002 | Ries et al. |
| 2002/0155242 | A1 | 10/2002 | Bellet et al. |
| 2003/0175457 | A1 | 9/2003 | Jousse et al. |
| 2003/0192612 | A1 | 10/2003 | Milhas |
| 2004/0058113 | A1 | 3/2004 | Werth |
| 2004/0126523 | A1 | 7/2004 | Masuda et al. |
| 2004/0265527 | A1 | 12/2004 | Schmitz et al. |
| 2005/0013955 | A1 | 1/2005 | Merzinger et al. |
| 2005/0031818 | A1 | 2/2005 | Micheneau |
| 2005/0037170 | A1 | 2/2005 | Bellet et al. |
| 2005/0131147 | A1 | 6/2005 | Brule |
| 2006/0099478 | A1 | 5/2006 | Schmitz et al. |
| 2006/0141188 | A1 | 6/2006 | Schmitz et al. |
| 2008/0193691 | A1 | 8/2008 | Bussi et al. |

FOREIGN PATENT DOCUMENTS

| DE | 4001125     | 12/1990 |
| DE | 4026161     | 2/1991  |
| DE | 4001126     | 12/1993 |
| DE | 19850227    | 6/2000  |
| EP | 0791153     | 8/1997  |
| EP | 1162061     | 12/2001 |
| EP | 1216825     | 6/2002  |
| EP | 1216826     | 6/2002  |
| EP | 1243831     | 9/2002  |
| EP | 1355098     | 10/2003 |
| EP | 1645412     | 4/2006  |
| GB | 2390658     | 1/2004  |
| JP | 03255290    | 11/1991 |
| JP | 10009548    | 1/1998  |
| JP | 05262673    | 9/2005  |
| WO | WO2005102681 | 11/2005 |
| WO | WO2005102694 | 11/2005 |
| WO | WO2006066944 | 6/2006  |
| WO | WO2006108721 | 10/2006 |

OTHER PUBLICATIONS

Yokohama Rubber Co. Ltd; Piper Impermeable to Refrigerant Gas, Fuel Oil etc.—Has Two=Part Inner Layer, Outer Layer and Reinforcement of Wire or Synthetic Fibre With Specified Elongation; Espacenet, Feb. 21, 1991; English Abstract of DE4026161 (A1).
Kobe Steel Ltd.; Incineration of Sludge by Fluidized-Bed Incinerator; Patent Abstracts of Japan; Jan. 16, 1998; English Abstract of JP 10-009548.
Kuraray Co Ltd., "Hose for coolant," Patent Abstracts of Japan, Publication Date: Nov. 14, 1991; English Abstract of JP-03 0255290.
Tokai Rubber Ind Ltd., "Fuel System Resin Hose and Its Production Method," Patent Abstract of Japan, Publication Date: Sep. 29, 2005; English Abstract of JP-2005 262673.

*Primary Examiner* — Michael C Miggins
(74) *Attorney, Agent, or Firm* — Millen, White, Zelano & Branigan, P.C.

(57) ABSTRACT

The present invention relates to the use of a multi-layered structure for the manufacture of gas conducts, namely for methane. The multi-layered structure comprises, from the inside to the outside, the following successive layers: a layer containing at least one polyamide, wherein the polyamide is chosen from PA11, PA12 and an aliphatic polyamide obtained from condensation reaction of an aliphatic diamine having 6 to 18 carbon atoms and an aliphatic diacid having 9 to 18 carbon atoms; optionally, a binding 2 layer; and a layer 3 chosen from an EVOH layer, a layer formed of a mixture of polyamide and a polyolefin with a polyamide matrix, a layer of PA6, Pa6-6, MXD.6 or MXD.10 and a layer of semi-aromatic copolyamide, the layer 3 being intended to be in contact with the transported gas.

13 Claims, No Drawings

USE OF MULTI-LAYERED STRUCTURE FOR THE MANUFACTURE OF GAS CONDUCTS, NAMELY FOR METHANE

The present invention relates to use of a particular multilayer structure for manufacturing gas ducts, and more particularly for methane ducts.

Currently gas ducts, especially methane ducts, are made out of rubber. These ducts, also called hoses, however have a certain number of drawbacks among which mention may especially be made of the cost and the weight.

An alternative to these rubber ducts is therefore sought, which is not only advantageous from an economic point of view, but which of course meets the demands linked to the use of such hoses for gas transport.

In particular, the primary criterion is the barrier property of the hose with respect to the gas transported and also the criteria conventionally imposed by user specifications, such as cold impact strength, thermal resistance, coupling behavior, resistance to the salt ($ZnCl_2$) etc.

It is in this context of searching for a satisfactory alternative solution that the Applicant has observed that thermoplastic multilayer structures could very advantageously be used for manufacturing gas ducts instead of the current elastomeric structures.

Document US 2002/036405 in the name of the Applicant proposes a thermoplastic multilayer structure for gas transport. This structure comprises at least one layer composed mainly of polyethylene (which is understood as being a homopolymer or copolymer of ethylene) and an outer layer made of polyamide.

Although such a structure proves satisfactory from the point of view of some of the mechanical properties (impact strength, burst strength, windability), it has a poor coupling behavior and in addition a thermal resistance that may be insufficient in certain applications due to the presence of at least one layer composed mainly of polyethylene.

The invention therefore relates to the use of a multilayer structure for manufacturing gas ducts, especially ducts for natural gas, this structure overcoming the drawbacks of the elastomer structures and of the thermoplastic structures taught by document US 2002/036405, and having, inter alia and simultaneously, good barrier properties to the gas transported and good thermal resistance properties.

The invention relates in particular to the use of a multilayer structure for manufacturing methane ducts.

According to the invention, this use employs a multilayer structure comprising, from the outside towards the inside, the following successive layers, these layers adhering to their respective area of contact:
  a layer 1 comprising at least one polyamide, the polyamide being chosen from PA-11, PA-12 and an aliphatic polyamide resulting from the condensation of an aliphatic diamine having from 6 to 18 carbon atoms and an aliphatic diacid having from 9 to 18 carbon atoms;
  optionally, a tie layer 2; and
  a layer 3 chosen from an EVOH layer, a layer formed from a blend of polyamide and a polyolefin with a polyamide matrix, a PA-6 or PA-6,6 layer, a semi-aromatic polyamide or semi-aromatic copolyamide layer and a polyphthalamide (PPA) layer, the layer 3 being intended to be in contact with the gas transported.

The structures employed within the scope of the use according to the present invention have a high barrier resistance to gases, such as methane.

In the particular case of methane, it is considered to have good barrier properties when the permeability, measured at 23° C., is below 5 $cm^3 \cdot mm/m^2 \cdot 24\ h \cdot atm$.

Such structures have, in addition, a high barrier resistance, while only being able to involve a limited number of layers. Thus, structures composed of 2 layers, or 3 layers in the case where the presence of a tie layer proves necessary in order to ensure the adhesion of layers 1 and 3, can indeed be envisaged.

Moreover, such structures also have the advantage of being able to be coextruded on the equipment commonly used in the field of thermoplastics.

In particular, in the case of use of these multilayer structures in the automotive field, the equipment manufacturers will employ, for manufacturing gas ducts, the same equipment that they commonly use for manufacturing multilayer structures intended, for example, for supplying petrol.

In addition, taking into account the multilayer character of these structures, the properties of the ducts can easily be adapted as a function of the particular applications desired and the environment into which the gas ducts are integrated.

In one particularly preferred version of the invention, the multilayer structures used do not comprise any layer composed of polyethylene such as that described in document US 2002/036405.

The description that follows details the compositions of the various layers making up the multilayer structures corresponding to the use that is the subject of the present invention.

According to a first aspect of the invention, the multilayer structure used for manufacturing gas ducts is formed from two or three successive layers, layer 1, layer 2 which is optional and layer 3, the layer 3 being intended to be in contact with the gas transported by the duct.

Layer 1

Layer 1 comprises at least one polyamide, the polyamide being chosen from PA-11, PA-12 and an aliphatic polyamide resulting from the condensation of an aliphatic diamine having from 6 to 18 carbon atoms and an aliphatic diacid having from 9 to 18 carbon atoms.

As examples of aliphatic polyamides, reference may be made to the products cited by the document US 2005/0031818 A1, especially to paragraphs [0042] to [0047].

In particular, PA-6,12, PA-9,12, PA-10,10 or else PA-10,12 may be used in the composition of layer 1.

The PA-11, PA-12 or aliphatic polyamide of layer 1 may in addition comprise at least one additive chosen from plasticizers, impact modifiers, dyes, pigments, brighteners, antioxidants, UV stabilizers and polyolefins, the latter possibly being functionalized or unfunctionalized.

A common plasticizer is n-butylbenzenesulphonamide (BBSA). But other plasticizers, such as those cited in paragraph [0052] of document US 2005/0031818 A1, could also be used.

Layer 2

Layer 2 is a tie layer that enables various layers to be bonded together in order to avoid any delamination phenomenon.

In the multilayer structure employed within the scope of the use according to the invention, layer 2 must adhere perfectly to layers 1 and 3.

As widely described in the prior art, especially in paragraphs [0068] to [0093] of document US 2005/0031818 A1, the tie is conventionally a functionalized polyolefin, the functionalization of the polyolefin being provided by a grafted or copolymerized carboxylic acid or carboxylic acid anhydride. This functionalized polyolefin may be blended with an unfunctionalized polyolefin.

The tie may also be a copolyamide or a blend of copolyamides.

Copolyamide-based compositions that are suitable for the multilayer structure according to the present invention are also described in document US 2005/0031818 A1 (paragraphs [0094] to [0111]) and also in document U.S. Pat. No. 7,063,873 (col. 5, line 3 to col. 6, line 50).

The tie may in addition comprise at least one additive chosen from plasticizers, impact modifiers, dyes, pigments, brighteners, antioxidants, UV stabilizers and polyolefins, the latter possibly being functionalized or unfunctionalized.

For example, the tie may comprise an impact modifier chosen from very low density polyethylenes and elastomers, this impact modifier being completely or partly functionalized. Reference can be made to the document WO 2006/066944 A1 that describes in detail the impact modifiers that are suitable within the scope of the present invention.

This layer 2 is however optional. Indeed, with regard to limiting the costs, this layer 2 is not inserted between layers 1 and 3, in the particular case where the compositions of layers 1 and 3 adhere well to each other.

Layer 3

Various compositions can be envisaged for layer 3, all these compositions enabling the use of the multilayer structure for manufacturing gas ducts.

Layer 3 is chosen from an EVOH layer, a layer formed from a blend of polyamide and a polyolefin with a polyamide matrix, a PA-6 or PA-6,6 layer, a semi-aromatic polyamide or semi-aromatic copolyamide layer and a polyphthalamide (PRA) layer.

Layer 3 may be an EVOH layer, EVOH being a saponified ethylene/vinyl acetate copolymer.

The term "EVOH layer" is understood to mean both a layer made up of EVOH, and a layer formed from a blend comprising at least 40% by weight of EVOH, the other constituents of the blend being then chosen from polyolefins, polyamides and optionally functional polymers.

Compositions based on EVOH that are suitable for the multilayer structures used within the scope of the present invention have been, in particular, described in document U.S. Pat. No. 7,063,873 (col. 7, line 18 to col. 8, line 11).

Layer 3 may also be formed from a blend of polyamide (A) and polyolefin (B) with a polyamide matrix.

The term "polyamide (A)" is understood to mean the condensation products:
of one or more amino acids;
of one or more lactams; or
of one or more salts or mixtures of diamines and diacids.

Copolyamides may also advantageously be used, such as those resulting from condensation:
of at least two alpha,omega-aminocarboxylic acids;
of two lactams;
of one lactam and one alpha,omega-aminocarboxylic acid;
of at least one alpha,omega-aminocarboxylic acid, at least one diamine and at least one diacid; or else
of at least one lactam, at least one diamine and at least one diacid.

Reference can be made to document US 2005/0031818 A1, in particular to paragraphs [0112] to [0123] that describe in detail examples of amino acids, lactams, diamines, diacids or alpha,omega-aminocarboyxlic acids.

Advantageously but non-limitingly, the polyamide may be chosen from PA-6 and PA-6,6; the copolyamide may be chosen from PA-6/12, PA-6/6,6, PA-6/12/6,6, PA-6/6,9/11/12, PA-6/6,6/11/12 and PA-6,9/12.

Blends of polyamides and/or of copolyamides may also be used.

The term "polyolefin (B)" is understood to mean a functionalized polyolefin (B1), an unfunctionalized polyolefin (B2) or a blend of at least one functionalized polyolefin (B1) and/or of at least one unfunctionalized polyolefin (B2).

An unfunctionalized polyolefin (B2) is conventionally a homopolymer or a copolymer of alpha-olefins or of diolefins.

A functionalized polyolefin (B1) is generally a homopolymer or a copolymer of alpha-olefins having reactive units (the functionalities), these reactive units being acid, anhydride or epoxy functional groups.

Functionalized polyolefins (B1) and unfunctionalized polyolefins (B2) that are suitable for a layer 3 composition comprising a polyamide (A) and a polyolefin (B) with a polyamide matrix are very broadly described in document US 2005/0031818 A1, in particular in paragraphs [0124] to [0205].

As examples of functionalized polyolefins, mention may be made of terpolymers of ethylene, of alkyl acrylate and of maleic anhydride or of glycidyl methacrylate, such as Lotader®, or polyolefins grafted by maleic anhydride, such as Orevac®, these products being sold by the Applicant.

Layer 3 may also be made of PA-6 or PA-6.6.

Layer 3 may even be made from a semi-aromatic polyamide or from a semi-aromatic copolyamide.

Such semi-aromatic polyamides have in particular been described in documents GB 1 490 453, U.S. Pat. No. 2,766,221 and more recently in document WO 2006/108721 A1.

Mention may be made, in a non-limiting way, of the semi-aromatic polyamides MXD-6 and MXD-10 and also the semi-aromatic polyamide, or the semi-aromatic copolyamide in the case where Z≠0, corresponding to the general formula MXD-10/Z in which;
MXD-10 denotes the condensation product of a mixture of xylylenediamines containing 70 to 100% of meta-xylylenediamine and sebacic acid;
Z denotes at least one unit chosen from:
the residues of a lactam;
the residues of an alpha,omega-aminocarboxylic acid;
the unit X1, Y1 in which X1 denotes the residues of an aliphatic, arylaliphatic, cycloaliphatic or aromatic diamine and Y1 denotes the residues of an aliphatic, cycloaliphatic or aromatic carboxylic diacid,
the Z/(MXD+10+Z) weight ratio being between 0 and 15%.

Preferably, the semi-aromatic copolyamide corresponds to the general formula X/Y, Ar in which:
Y denotes the residues of an aliphatic diamine having from 6 to 20 carbon atoms;
Ar denotes the residues of an aromatic carboxylic diacid;
X denotes:
either the residues of aminoundecanoic acid $NH_2$—$(CH_2)_{10}$—COOH, of lactam-12 or of the corresponding amino acid;
or the unit Y,x that is the residue of the condensation of the diamine with an aliphatic diacid x having between 6 and 20 carbon atoms;
or else the unit Y,I that is the residue of the condensation of the diamine with isophthalic acid.

Such copolyamides have been described in documents EP 0 550 314, U.S. Pat. No. 3,843,611, U.S. Pat. No. 5,708,125 and more recently in document US 2005/0096430 A1.

Mention may be made, in a non-limiting way, of the following semi-aromatic copolyamides: 6,6/6,T; 6/6,T; 6,I/6,T; 12/6,T; 12,12/12,T; 10,6/10,T; 11/10,T; 12/12,T; 10,10/10,T and 10,1/10,T.

Lastly, layer 3 may be a polyphthalamide (PPA) layer.

The PPA is an aromatic polyamide obtained by the polycondensation of at least one phthalic acid and at least one aliphatic diamine. The phthalic acid may be a terephthalic, isophthalic or orthophthalic acid or else a mixture comprising at least two of said acids. The aliphatic diamine advantageously comprises from 3 to 12 carbon atoms and preferably from 6 to 9.

The PPA may more particularly be a polyterephthalamide, that is to say a PPA in which terephthalic acid is used.

More preferentially, the PPA is obtained by the copolymerization of terephthalic acid, of isophthalic acid, of at least one dicarboxylic acid, preferably adipic acid, and of at least one aliphatic diamine.

The PPAs sold by Solvay Advanced Polymers under the trade name AMODEL® can be used within the scope of the present invention.

According to a second aspect of the invention, the multilayer structure used for manufacturing gas ducts is formed from three or four successive layers, layer 1, the optional layer 2, layer 3 and layer 5, layer 5 being in contact with the gas transported by the duct.

Layers 1 to 3

The composition of each of layers 1 to 3 is identical to that described above for the first aspect of the invention.

Layer 5

Layer 5 is a polyamide-based layer.

Layer 5 may especially comprise at least one polyamide, the polyamide being chosen from PA-11, PA-12 and an aliphatic polyamide resulting from the condensation of an aliphatic diamine having from 6 to 18 carbon atoms and an aliphatic diacid having from 9 to 18 carbon atoms.

Layer 5 may in addition comprise a functionalized polyolefin and/or an unfunctionalized polyolefin.

Reference may be made to the description of the functionalized polyolefins (B1) and unfunctionalized polyolefins (B2) given above.

Layer 5 may also comprise one or more additives, in particular those already mentioned previously for layer 1.

Preferably, in a same multilayer structure, the polyamide-based composition of layer 5 is identical to that described above for the composition of layer 1.

According to a third aspect of the invention, the multilayer structure used for manufacturing gas ducts is formed from three, four or five successive layers, layer 1, the optional layer 2, layer 3, the optional layer 4 and layer 5, layer 5 being in contact with the gas transported by the duct.

Layers 1 to 3 and 5

The composition of each of layers 1 to 3 is identical to that described above for the first aspect of the invention.

For the composition of layer 5, reference can be made to that which has already been described for the second aspect of the invention concerning layer 5.

Layer 4

As the previously described layer 2, layer 4 is optional.

This layer 4 is a tie layer inserted between layers 3 and 5 in order to enable or to optimize the bonding of these layers 3 and 5 to each other, and thus to avoid any delamination phenomenon.

Reference can be made to that which has been described previously for layer 2 in order to know the compositions capable of being used for the tie layer 4.

In an advantageous version, in a same multilayer structure, the polyamide-based composition of layer 5 is identical to that described above for the composition of layer 1.

In a particularly advantageous version of the invention, the compositions of layers 2 and 4 on the one hand and layers 1 and 5 on the other hand, of a same multilayer structure, are identical.

The multilayer structure used within the scope of the present invention, whether it comprises two, three, four or five layers, may in addition include a protective layer 1', placed on layer 1.

This protective layer 1' may be a layer for protecting against heat, a flame-retardant layer, an abrasion-resistant layer, an oxidation-resistant layer or else a layer having several of these properties simultaneously.

The multilayer structure described above is advantageously shaped so as to be in the form of a hollow body, preferably in the form of a tube or a pipe.

In particular, the tubes are manufactured by the technique of coextrusion, hence the need to have perfect adhesion between the various coextruded layers forming the structure.

When the multilayer structure is a tube, this tube can be moulded so as to obtain a smooth tube or on the other hand, a ringed tube.

The present invention will now be illustrated by various examples for which the methane permeability has been measured at 23° C.

The products used were the following:
PA-11: PA-11 of reference BESN TL;
PA-11p: PA-11 of reference BESNO P40 TL with a plasticizer (BBSA);
Tie: PLATAMID®1 (50%) and PLATAMID®2 (50%), PLATAMID®1 being a 6/12 (40/60) copolyamide and PLATAMID®2 being a 6/12 (70/30) copolyamide, of reference HX 2560T; and
ORGALLOY: a mixture of mostly PA-6, high density polyethylene and a compatibilizer containing an anhydride functionality of reference 18501N, this mixture bearing the reference LE60THM.

All the products listed above are sold by Arkema France.

The following multilayer structures were coextruded in the form of 6×8 (mm) tubes, the thicknesses in μm of each of the layers being shown between the brackets:
PA-11 (1000);
PA-11p (1000);
PA-11/tie/ORGALLOY (450/100/450);
PA-11p/tie/ORGALLOY (450/100/450);
PA-11/tie/ORGALLOY/tie/PA-11 (400/50/100/50/400);
PA-11p/tie/ORGALLOY/tie/PA-11p (400/50/100/50/400);
PA-11/tie/EVOH/tie/PA-11 (400/50/100/50/400); and
PA-11p/tie/EVOH/tie/PA-11p (400/50/100/50/400).

The methane permeability of each of these structures was measured and gave the following results:

|  | Methane permeability ($cm^3 \cdot mm/m^2 \cdot 24\,h \cdot atm$), 23° C. |
|---|---|
| PA-11 | 5 |
| PA-11p | 13 |
| PA-11/tie/ORGALLOY | 1 |
| PA-11p/tie/ORGALLOY | 1 |
| PA-11/tie/ORGALLOY/tie/PA-11 | 4 |
| PA-11p/tie/ORGALLOY/tie/PA-11p | 4 |
| PA-11/tie/EVOH/tie/PA-11 | <0.2 |
| PA-11p/tie/EVOH/tie/PA-11p | <0.2 |

It can therefore be seen that the structures employed within the scope of the use conforming to the present invention give excellent results in terms of methane barrier properties, the measured permeability being well below 5 $cm^3 \cdot mm/m^2 \cdot 24\,h \cdot atm$.

It is stated that all the documents cited in the present description, in particular the passages picked out from these documents, are incorporated by way of reference.

The invention claimed is:

1. A process for transporting natural gas, comprising transporting said natural gas in a multilayer gas duct structure comprising, from the outside towards the inside, the following successive layers:
   a layer 1 comprising at least one polyamide, that is PA-11, PA-12 or an aliphatic polyamide resulting from the condensation of an aliphatic diamine having from 6 to 18 carbon atoms and an aliphatic diacid having from 9 to 18 carbon atoms;
   optionally, in contact with layer 1 a tie layer 2; and
   a layer 3, in contact with layer 1 or, if present, layer 2, which layer 3 is an EVOH layer, a layer formed from a blend of polyamide and a polyolefin with a polyamide matrix, a PA-6, PA-6,6, MXD-6 or MXD-10 layer or a semi-aromatic copolyamide layer, the layer 3 being in contact with the transported natural gas.

2. The process according to claim 1, wherein the layer 1 further comprises at least one additive that is plasticizers, impact modifiers, functionalized or unfunctionalized polyolefins, dyes, pigments, brighteners, antioxidants or UV stabilizers.

3. The process according to claim 1, wherein the multilayer structure further comprises a protective layer 1', placed on the layer 1.

4. The process according to claim 1, wherein the layer 3 is coated by the following successive layer(s):
   optionally, a tie layer 4; and
   a polyamide-based layer 5, the layer 5 being in contact with the gas transported.

5. The process according to claim 4, wherein the layer 5 comprises at least one polyamide that is PA-11, PA-12 or an aliphatic polyamide resulting from the condensation of an aliphatic diamine having from 6 to 18 carbon atoms and an aliphatic diacid having from 9 to 18 carbon atoms.

6. The process according to claim 4, wherein the layer 5 further comprises a functionalized polyolefin and/or an unfunctionalized polyolefin.

7. The process according to claim 1, wherein the multilayer structure is a tube.

8. The process according to claim 7, wherein the tube is smooth.

9. The process according to claim 7, wherein the tube is ringed.

10. A process for transporting natural gas, consisting of transporting said natural gas in a multilayer gas duct structure consisting of, from the outside towards the inside, the following successive layers:
    a layer 1 comprising at least one polyamide, that is PA-11, PA-12 or an aliphatic polyamide resulting from the condensation of an aliphatic diamine having from 6 to 18 carbon atoms and an aliphatic diacid having from 9 to 18 carbon atoms;
    optionally, in contact with layer 1 a tie layer 2; and
    a layer 3, in contact with layer 1 or, if present, layer 2, which layer 3 is an EVOH layer, a layer formed from a blend of polyamide and a polyolefin with a polyamide matrix, a PA-6, PA-6,6, MXD-6 or MXD-10 layer or a semi-aromatic copolyamide layer, the layer 3 being in contact with the transported natural gas.

11. A process for transporting natural gas, comprising transporting said natural gas in a multilayer gas duct structure comprising, from the outside towards the inside, the following successive layers:
    a layer 1 comprising at least one polyamide, that is PA-11, PA-12 or an aliphatic polyamide resulting from the condensation of an aliphatic diamine having from 6 to 18 carbon atoms and an aliphatic diacid having from 9 to 18 carbon atoms;
    in contact with layer 1 a tie layer 2; and
    a layer 3, in contact with layer 2, which layer 3 is an EVOH layer, a layer formed from a blend of polyamide and a polyolefin with a polyamide matrix, a PA-6, PA-6,6, MXD-6 or MXD-10 layer or a semi-aromatic copolyamide layer,
    the layer 3 being in contact with the transported natural gas.

12. A process for transporting natural gas, comprising transporting said natural gas in a multilayer gas duct structure comprising, from the outside towards the inside, the following successive layers:
    a layer 1 comprising at least one polyamide, that is PA-11, PA-12 or an aliphatic polyamide resulting from the condensation of an aliphatic diamine having from 6 to 18 carbon atoms and an aliphatic diacid having from 9 to 18 carbon atoms;
    optionally, in contact with layer 1 a tie layer 2; and
    a layer 3, in contact with layer 1 or, if present, layer 2, which layer 3 is an EVOH layer, a layer formed from a blend of polyamide and a polyolefin with a polyamide matrix, a PA-6,6, MXD-6 or MXD-10 layer or a semi-aromatic copolyamide layer,
    the layer 3 being in contact with the transported natural gas.

13. The process according to claim 12, wherein layer 3 is EVOH layer, a layer formed from a blend of polyamide and a polyolefin with a polyamide matrix, a MXD-6 or MXD-10 layer or a semi-aromatic copolyamide layer.

* * * * *